H. A. WENTWORTH.
GUARDED LACING HOOK FOR SHOES, GLOVES, &c.
APPLICATION FILED JAN. 28, 1910.

963,674.  Patented July 5, 1910.

WITNESSES  INVENTOR

UNITED STATES PATENT OFFICE.

HERBERT ALBERTO WENTWORTH, OF BANGOR, MAINE.

GUARDED LACING-HOOK FOR SHOES, GLOVES, &c.

963,674.  Specification of Letters Patent.  Patented July 5, 1910.

Application filed January 28, 1910. Serial No. 540,626.

*To all whom it may concern:*

Be it known that I, HERBERT ALBERTO WENTWORTH, a citizen of the United States of America, residing at Bangor, in the county of Penobscot, in the State of Maine, have invented certain new and useful Improvements in Guarded Lacing-Hooks for Shoes, Gloves, &c., whereof the following is a specification.

This invention relates to a lacing hook for shoes, gloves and similar purposes provided with a guard for protecting skirts, sleeves or trousers from engagement and wearing contact with the hook. The device is especially useful to ladies' shoes.

The object of the invention is to provide a guarded lacing hook which is cheaply struck from sheet metal and easily applied to the shoe.

Figure 1:
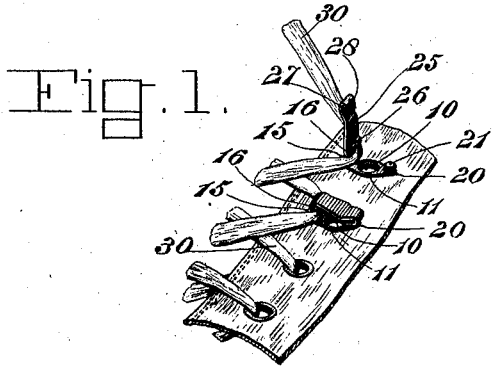
Figures 2, 3:
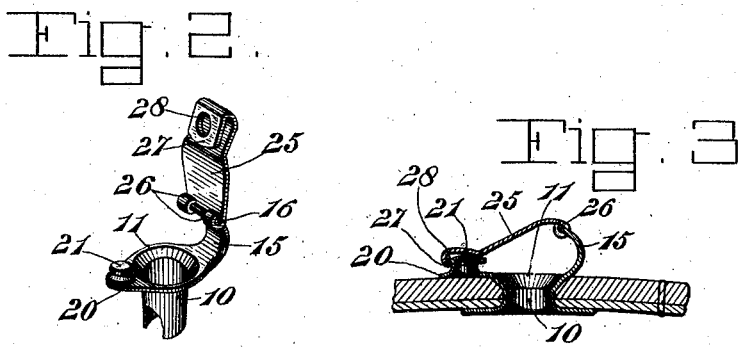
Figure 4:
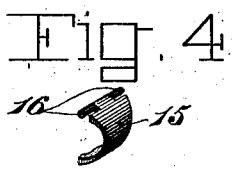

Figure 1 of the accompanying drawings represents a perspective view of a lacing flap of a shoe provided with guarded lacing hooks embodying one form of this invention. Fig. 2 represents on a larger scale a lacing hook embodying this invention, the guard being in open position. Fig. 3 represents on an enlarged scale a transverse section through a lacing flap and through one of these lacing hooks applied thereto, the guard being in closed position. Fig. 4 represents an enlarged perspective view of the hook proper broken off.

The same reference numbers indicate corresponding parts in all the figures.

An eyelet 10 provided with an integral top flange 11 serves as an attaching means for securing the device to one of the closing flaps or other part of a shoe, glove or other article. An extension integral with said flange curves upward therefrom and constitutes a lacing hook proper 15. This hook is provided at its upper end with a hinge member 16. An extension 20, also integral with said flange, lies in a horizontal plane diametrically opposite said hook and is provided with an automatic fastener member 21.

A guard 25, provided at one end with a hinge member 26 and at the other end with a fastener member 28, is hinged to the upper end of the hook 15. That part of the hinge belonging to the hook is preferably the pintle member and that part belonging to the guard is preferably the socket member. In such construction the socket hinge members are turned upward, instead of downward (as in the case when they are a part of the hook) and chafing of the lacing cord or string by contact with the ends forming the socket is avoided. The guard is preferably constructed with an inturned outer end 27 folded under the body of the guard and the fastener member 28 is in the form of a hole punched in said inturned end.

The guard 25 swings open as shown in Fig. 2 to permit the lacing to pass into engagement with the hook and swings closed as shown in Fig. 3 to cover the opening in the hook. The engagement of the members 21 and 28 constituting an automatic fastener holds the guard in closed position. The fastener is preferably a spring stud and socket fastener and the stud member 21 is preferably on the eyelet and the socket member 28 on the guard. When constructed as shown the socket member is a hole in the inturned or folded end 27 of the guard.

In use the lacing hooks are secured to the flaps to be laced. The eyelet 10, serving as a means of attachment, is inserted in an eyelet hole in said flap and swaged into position by an eyelet machine used for that purpose. In lacing the shoe or glove the guard is swung in open position as shown in Fig. 2 and at the top of Fig. 1 and the lacing 30 is passed under the hook 15 as shown at the top of Fig. 1, then the guard is closed and fastened as shown intermediately in Fig. 1.

This guarded lacing device comprises two parts merely which can be struck from sheet metal and readily shaped and applied in an economical manner.

I claim as my invention:

A guarded lacing hook comprising a tubular eyelet having an integral outturned flange on its top, said flange being provided on one side of the eyelet opening with a hook integral with said flange and on the other side thereof with a stud fastener member also integral with said flange, and a guard hinged to said hook and provided with an inturned outer end having a hole constituting a socket fastener member adapted to engage said stud fastener member of the flange, said fastener members being covered by the body of the guard when the guard is closed.

HERBERT ALBERTO WENTWORTH.

Witnesses:
 ALLAN P. TRASK,
 E. N. MILLER.